US012677292B2

(12) United States Patent
Kim et al.

(10) Patent No.: US 12,677,292 B2
(45) Date of Patent: Jul. 7, 2026

(54) METHOD AND APPARATUS FOR UPLINK TRANSMISSION AND RECEPTION IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Kyuseok Kim, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 550 days.

(21) Appl. No.: 17/782,936

(22) PCT Filed: Jul. 27, 2021

(86) PCT No.: PCT/KR2021/009714
§ 371 (c)(1),
(2) Date: Oct. 13, 2022

(87) PCT Pub. No.: WO2022/025590
PCT Pub. Date: Feb. 3, 2022

(65) Prior Publication Data
US 2023/0232415 A1 Jul. 20, 2023

(30) Foreign Application Priority Data

Jul. 29, 2020 (KR) ........................ 10-2020-0094646
Mar. 11, 2021 (KR) ........................ 10-2021-0032149

(51) Int. Cl.
H04W 72/232 (2023.01)
H04L 5/00 (2006.01)

(52) U.S. Cl.
CPC ......... H04W 72/232 (2023.01); H04L 5/0048 (2013.01)

(58) Field of Classification Search
CPC ............ H04W 72/232; H04W 56/0035; H04L 5/0048; H04L 5/0094; H04L 5/0023; H04L 5/0051; H04B 7/0456; Y02D 30/70
See application file for complete search history.

(56) References Cited

U.S. PATENT DOCUMENTS

2019/0149299 A1* 5/2019 Lee ........................ H04L 5/0092
370/329
2019/0261279 A1 8/2019 Qi
(Continued)

FOREIGN PATENT DOCUMENTS

WO 2019/127199 A1 7/2019
WO 2019/174512 A1 9/2019

OTHER PUBLICATIONS

3GPP TSG RAN WG1 Meeting #92bis; R1-1803912; Source: ZTE, Sanechips; Title: Remaining issues on PT-RS; Sanya, China, Apr. 16-20, 2018. See §2.1 (PT-RS to DMRS port association (Year: 2018).*
(Continued)

*Primary Examiner* — Mohammed S Chowdhury
(74) *Attorney, Agent, or Firm* — BRYAN CAVE LEIGHTON PAISNER LLP

(57) ABSTRACT

Disclosed are a method and apparatus for uplink transmission and reception in a wireless communication system. The method for performing, by a terminal, an uplink transmission in a wireless communication system according to an embodiment of the present disclosure comprises the steps of: receiving, from a base station, downlink control information (DCI) including a phase tracking reference signal (PTRS)-demodulation reference signal (DMRS) association field; and performing the uplink transmission on the basis of the DCI. The PTRS-DMRS association field may include first information for a first resource group, related to the association between a PTRS port and a DMRS port and second (Continued)

TRANSMITTING DCI INCLUDING A PTRS-DMRS ASSOCIATION FIELD — S910

PERFORMING UPLINK RECEPTION TRANSMITTED BASED ON THE DCI — S920 information for a second resource group, related to the association between the PTRS port and the DMRS port.

6 Claims, 11 Drawing Sheets

(56)                References Cited

U.S. PATENT DOCUMENTS

| | | | |
|---|---|---|---|
| 2019/0306809 A1 | 10/2019 | Qi | |
| 2020/0076557 A1 | 3/2020 | Sun et al. | |
| 2021/0036746 A1* | 2/2021 | Liu | H04B 7/0456 |
| 2021/0044467 A1* | 2/2021 | Xi | H04L 5/0007 |
| 2022/0052807 A1* | 2/2022 | Liu | H04L 5/0051 |
| 2022/0123799 A1* | 4/2022 | Varatharaajan | H04L 5/0048 |
| 2023/0085874 A1* | 3/2023 | Khoshnevisan | H04W 72/23 |
| | | | 370/329 |
| 2024/0214041 A1* | 6/2024 | Yuan | H04B 7/0473 |

OTHER PUBLICATIONS

3GPP TSG RAN WG1 Meeting #92bis; R1-1803748; Source: CATT; Title: Remaining issues on PT-RS; Sanya, China, Apr. 16-20, 2018. See §2 (PT-RS port indication). (Year: 2018).*

3GPP TSG RAN WG1 Meeting #92bis; R1-1803824; Source: vivo; Title: Remaining issues on PT-RS; Sanya, China, Apr. 16-20, 2018. See §2.1 (PTRS port association in the UL transmission). (Year: 2018).*

3GPP TSG RAN WG1 Meeting #92bis; R1-1804199; Source: Lenovo, Motorola Mobility; Title: Remaining issues on PTRS; Sanya, China, Apr. 16-20, 2018 (Year: 2018).*

Vivo, "Remaining issues on PT-RS", 3GPP TSG RAN WG1 Meeting #92, Feb. 26-Mar. 2, 2018, R1-1801526.

CATT, "Remaining issues on PT-RS", 3GPP TSG RAN WG1 Meeting #92, Feb. 26-Mar. 2, 2018, R1-1801725.

* cited by examiner

METHOD AND APPARATUS FOR UPLINK TRANSMISSION AND RECEPTION IN WIRELESS COMMUNICATION SYSTEM

TECHNICAL FIELD

The present disclosure relates to a wireless communication system, and in more detail, relates to an uplink transmission/reception method and apparatus in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide an uplink transmission/reception method and apparatus in a wireless communication system.

An additional technical object of the present disclosure is to provide a method and apparatus for transmitting and receiving uplink based on association information between a phase tracking reference signal (PTRS) and a demodulation reference signal (DMRS) in a wireless communication system.

The technical objects to be achieved by the present disclosure are not limited to the above-described technical objects, and other technical objects which are not described herein will be clearly understood by those skilled in the pertinent art from the following description.

Technical Solution

A method for performing uplink transmission by a user equipment (UE) in a wireless communication system according to an aspect of the present disclosure may include receiving downlink control information (DCI) including a phase tracking reference signal (PTRS)-demodulation reference signal (DMRS) association field from a base station; and performing the uplink transmission based on the DCI, wherein the PTRS-DMRS association field includes first information related to an association between a PTRS port and a DMRS port for a first resource group and second information related to an association between the PTRS port and the DMRS port for a second resource group.

A method for performing uplink reception by a base station in a wireless communication system according to an aspect of the present disclosure may include: transmitting, to a user equipment (UE), downlink control information (DCI) including a phase tracking reference signal (PTRS)-demodulation reference signal (DMRS) association field; and receiving the uplink transmitted based on the DCI through the UE, wherein the PTRS-DMRS association field includes first information related to an association between a PTRS port and a DMRS port for a first resource group and second information related to an association between the PTRS port and the DMRS port for a second resource group.

Technical Effects

According to an embodiment of the present disclosure, an uplink transmission/reception method and apparatus may be provided in a wireless communication system.

According to an embodiment of the present disclosure, a method and apparatus for transmitting and receiving uplink based on association information between a phase tracking reference signal and a demodulation reference signal may be provided in a wireless communication system.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

BEST MODE

Figure 1:
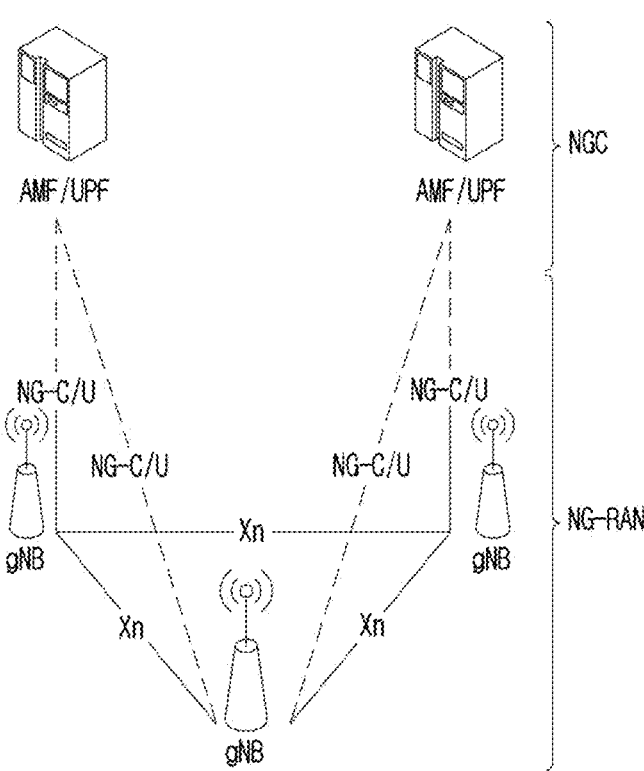
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management

CQI: Channel Quality Indicator

CRI: channel state information-reference signal resource indicator

CSI: channel state information

CSI-IM: channel state information-interference measurement

CSI-RS: channel state information reference signal

DMRS: demodulation reference signal

FDM: frequency division multiplexing

FFT: fast Fourier transform

IFDMA: interleaved frequency division multiple access

IFFT: inverse fast Fourier transform

L1-RSRP: Layer 1 reference signal received power

L1-RSRQ: Layer 1 reference signal received quality

MAC: medium access control

NZP: non-zero power

OFDM: orthogonal frequency division multiplexing

PDCCH: physical downlink control channel

PDSCH: physical downlink shared channel

PMI: precoding matrix indicator

RE: resource element

RI: Rank indicator

RRC: radio resource control

RSSI: received signal strength indicator

Rx: Reception

QCL: quasi co-location

SINR: signal to interference and noise ratio

SSB (or SS/PBCH block): Synchronization signal block (including PSS (primary synchronization signal), SSS (secondary synchronization signal) and PBCH (physical broadcast channel))

TDM: time division multiplexing

TRP: transmission and reception point

TRS: tracking reference signal

Tx: transmission

UE: user equipment

ZP: zero power

Overall System

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
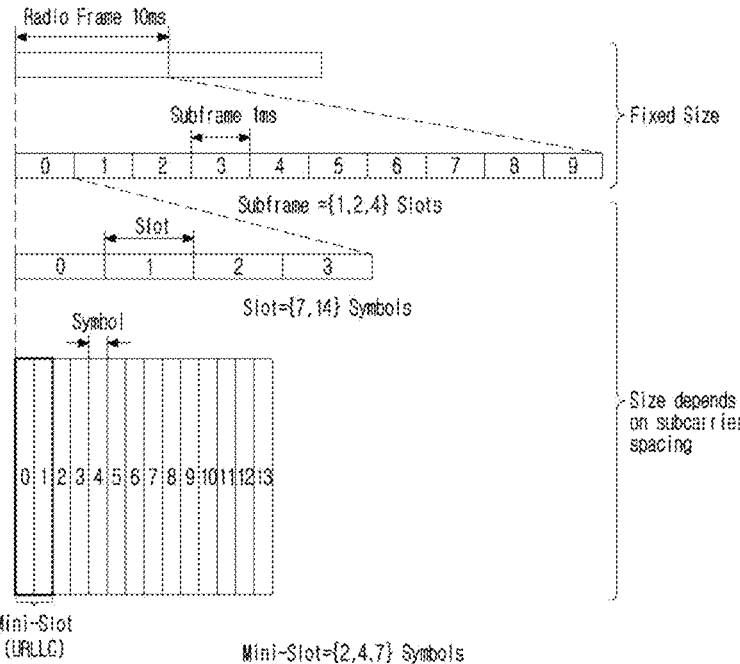
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz- 7125 MHz | 15, 30, 60 kHz |
| FR2 | 24250 MHz- 52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration p, slots are numbered in an increasing order of $n_s^\mu\in\{0, \ldots, N_{slot}^{subframe,\mu}-1\}$ in a subframe and are numbered in an increasing order of $n_{s,f}^\mu\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
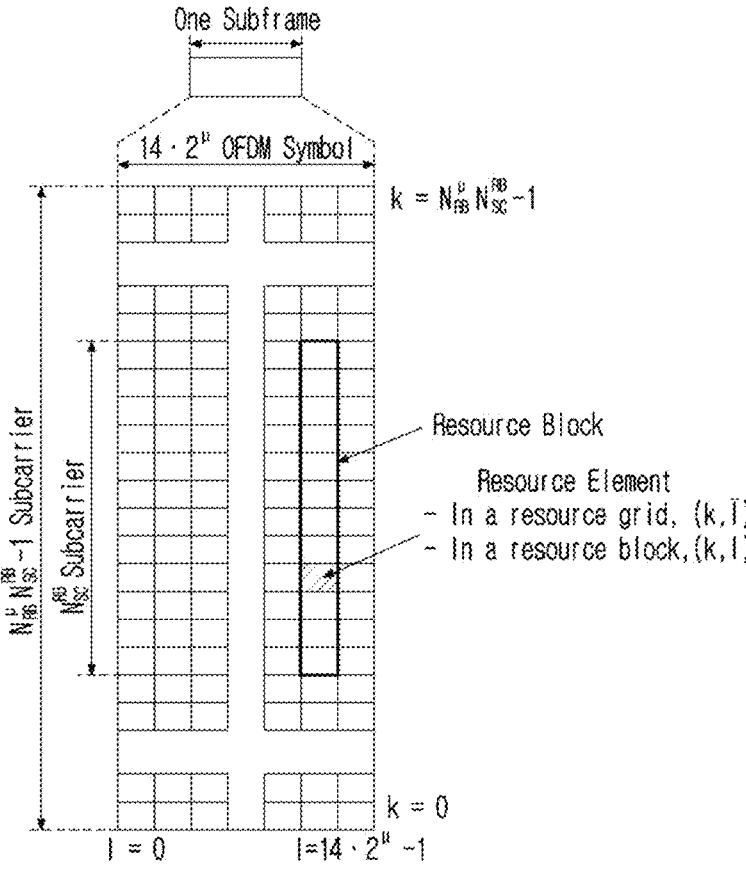
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14\cdot2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k, l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k, l) is used. Here, l=0, . . . , $N_{symb}^\mu-1$. A resource element (k, l') for p and an antenna port p corresponds to a complex value, $a_{k, l'}^{(p,\mu)}$. When there is no risk of confusion or when a specific antenna port or numerology is not specified, indexes p and p may be dropped, whereupon a complex value may be $a_{k, l'}^{(p)}$ or $a_{k, l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration p is identical to 'point A'. A relationship between a common resource block number $n_{CRB}^\mu$ and a resource element (k, l) for a subcarrier spacing configuration p in a frequency domain is given as in the following Equation 1.

$$n_{CRB}^\mu = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + n_{BWP,i}^{start,\mu} \qquad \text{[Equation 2]}$$

$N_{BWP,i}^{start,\mu}$ is a common resource block that a BWP starts relatively to common resource block 0.

Figure 4:
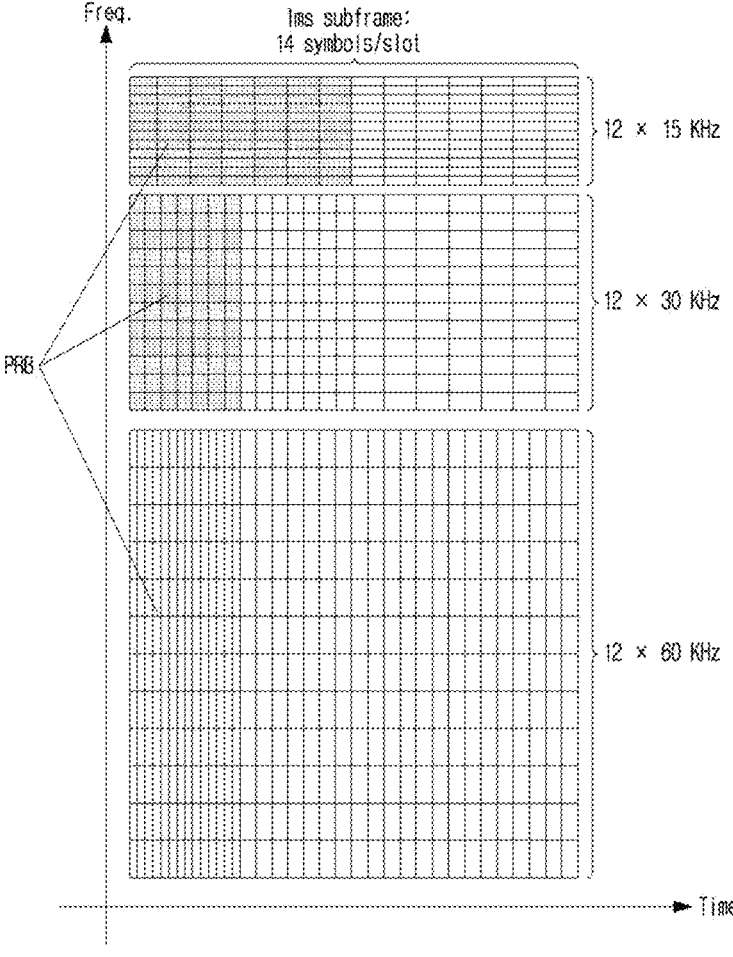
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
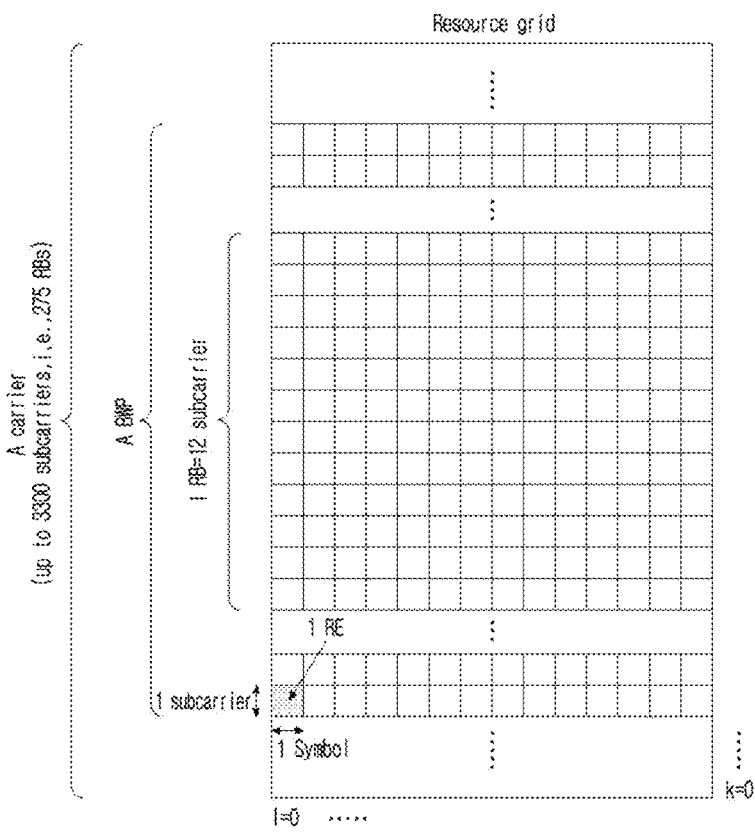
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
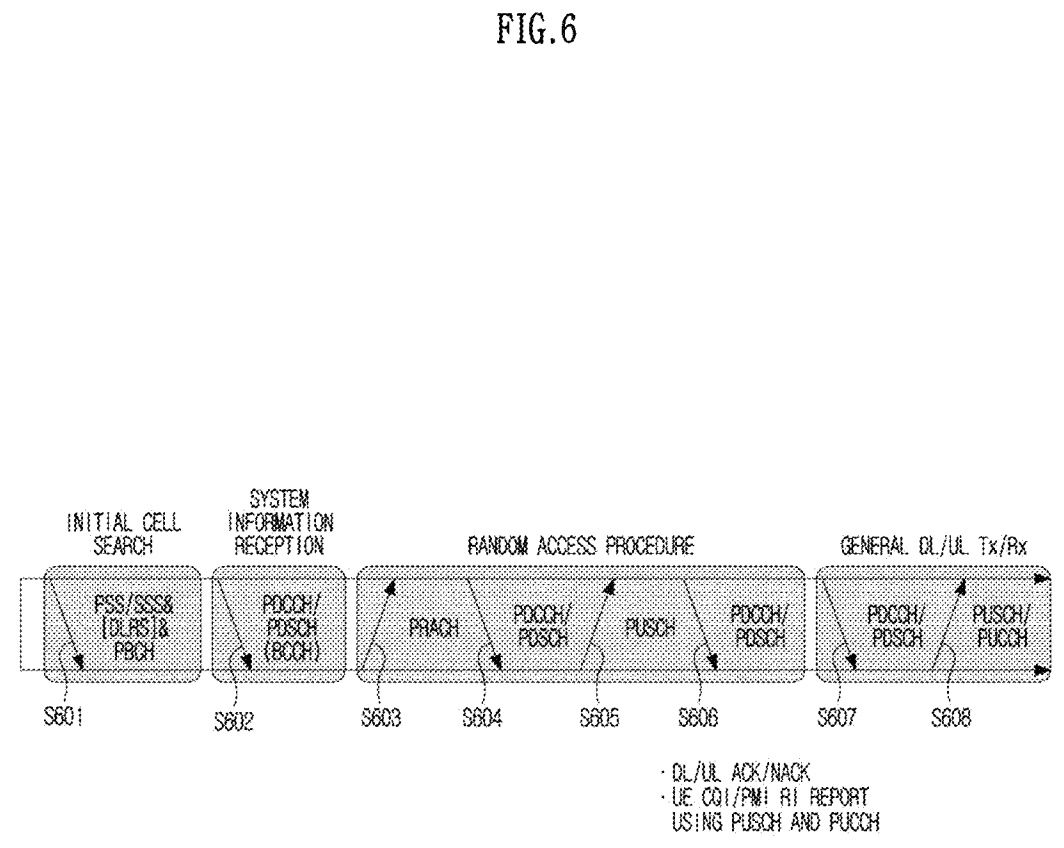

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted. DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH) transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
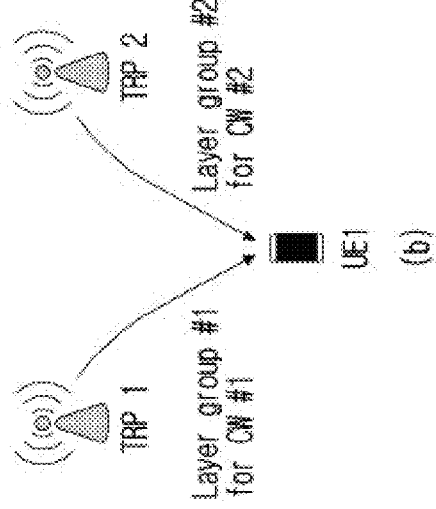
FIG. 7 illustrates a method of transmitting multiple TRPs in a wireless communication system to which the present disclosure may be applied.
Figure 7:
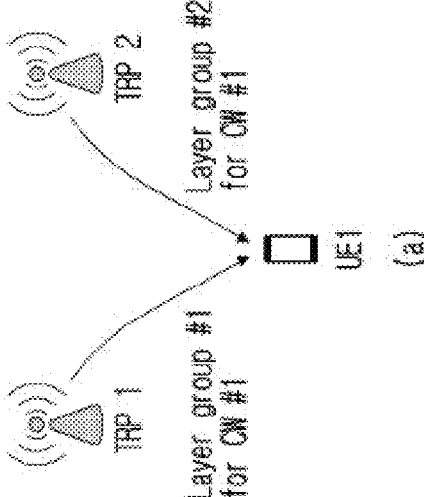

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following methods are discussed.

1) Method 1 (SDM): Time and frequency resource allocation is overlapped and n (n<=Ns) TCI states in a single slot
1-a) Method 1a.
The same TB is transmitted in one layer or layer set at each transmission time (occasion) and each layer or each layer set is associated with one TCI and one set of DMRS port(s).
A single codeword having one RV is used in all spatial layers or all layer sets. With regard to UE, different coded bits are mapped to a different layer or layer set by using the same mapping rule
1-b) Method 1b
The same TB is transmitted in one layer or layer set at each transmission time (occasion) and each layer or each layer set is associated with one TCI and one set of DMRS port(s).
A single codeword having one RV is used in each spatial layer or each layer set. RV(s) corresponding to each spatial layer or each layer set may be the same or different.
1-c) Method 1c
The same TB having one DMRS port associated with multiple TCI state indexes is transmitted in one layer at one transmission time (occasion) or the same TB having multiple DMRS ports one-to-one associated with multiple TCI state indexes is transmitted in one layer.
In case of the above-described method 1a and 1c, the same MCS is applied to all layers or all layer sets.

2) Method 2 (FDM): Frequency resource allocation is not overlapped and n (n<=Nf) TCI states in a single slot
Each non-overlapping frequency resource allocation is associated with one TCI state.
The same single/multiple DMRS port(s) are associated with all non-overlapping frequency resource allocation.
2-a) Method 2a
A single codeword having one RV is used for all resource allocation. With regard to UE, common RB matching (mapping of a codeword to a layer) is applied to all resource allocation.
2-b) Method 2b
A single codeword having one RV is used for each non-overlapping frequency resource allocation. A RV corresponding to each non-overlapping frequency resource allocation may be the same or different.
For the above-described method 2a, the same MCS is applied to all non-overlapping frequency resource allocation.
3) Method 3 (TDM): Time resource allocation is not overlapped and n (n<=Nt1) TCI states in a single slot
Each transmission time (occasion) of a TB has time granularity of a mini-slot and has one TCI and one RV.
A common MCS is used with a single or multiple DMRS port(s) at all transmission time (occasion) in a slot.
A RV/TCI may be the same or different at a different transmission time (occasion).
4) Method 4 (TDM): n (n<=Nt2) TCI states in K (n<=K) different slots
Each transmission time (occasion) of a TB has one TCI and one RV.
All transmission time (occasion) across K slots uses a common MCS with a single or multiple DMRS port(s).
A RV/TCI may be the same or different at a different transmission time (occasion).
Hereinafter, MTRP URLLC is described.

In the present disclosure, DL MTRP URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 and shares received data/DCI through a backhaul link connected between TRPs. UE configured with a UL MTRP-URLLC transmission method transmits the same data/UCI by using a different layer/time/frequency resource. Here, UE is configured from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.

Here, an UL TCI state has Tx beam and/or Tx power information of UE and spatial relation information, etc. instead of a TCI state may be configured to UE through other parameter. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for an open loop parameter Po and an alpha (up to 32 parameter value sets per cell), q_d: an index of a DL RS resource for PL (pathloss) measurement (up to 4 measurement per cell), 1: a closed loop power control process index (up to 2 processes per cell)).

Hereinafter, MTRP eMBB is described.

In the present disclosure, MTRP-eMBB means that multiple TRPs transmit different data (e.g., a different TB) by using a different layer/time/frequency. UE configured with a MTRP-eMBB transmission method receives an indication on multiple TCI states through DCI and assumes that data received by using a QCL RS of each TCI state is different data.

On the other hand, whether of MTRP URLLC transmission/reception or MTRP eMBB transmission/reception may be understood by UE by separately dividing RNTI for MTRP-URLLC and RNTI for MTRP-eMBB and using them. In other words, when CRC masking of DCI is performed by using RNTI for URLLC, UE is considered as URLLC transmission and when CRC masking of DCI is performed by using RNTI for eMBB, UE is considered as eMBB transmission. Alternatively, a base station may configure MTRP URLLC transmission/reception to UE or may configure TRP eMBB transmission/reception through other new signaling.

In a description of the present disclosure, it is described by assuming cooperative transmission/reception between 2 TRPs for convenience of description, but a method suggested in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/UCI is received/transmitted from/to a TRP 1.

Embodiments of the present disclosure described below may be utilized in a situation in which MTRP cooperatively transmits a PDCCH (e.g., the same PDCCH is repeatedly transmitted or transmitted separately), and some embodiments may also be utilized in a situation in which MTRP cooperatively transmits a PDSCH or cooperatively receives a PUSCH/PUCCH.

In addition, in describing the present disclosure, the meaning that a plurality of base stations (i.e., MTRP) repeatedly transmits the same PDCCH may mean that the same DCI is transmitted through a plurality of PDCCH candidates, and the plurality of base stations transmit the same DCI may mean that it has been repeatedly transmitted. The same DCI may mean two DCIs having the same DCI format/size/payload. Alternatively, even if the payloads of the two DCIs are different, if the scheduling result is the same, it may be said that the two DCIs are the same DCI. For example, the time domain resource allocation (TDRA) field of DCI relatively determines a slot/symbol position of data and a slot/symbol position of A/N based on a DCI reception time. In this case, when the DCI received at time n and the DCI received at time n+1 inform the UE of the same scheduling result, the TDRA fields of the two DCIs are different, and consequently, the DCI payload is inevitably different. The number of repetitions R may be directly instructed by the base station to the terminal or may be mutually promised. Alternatively, even if the payloads of the two DCIs are different and the scheduling results are not the same, if the scheduling result of one DCI is a subset of the scheduling result of the other DCI, it may be said to be the same DCI. For example, when the same data is TDM and repeatedly transmitted N times, DCI 1 received before the first data indicates repetition of data N times, and DCI 2 received after the first data and before the second data indicates N−1 data repetition. The scheduling data of DCI 2 is a subset of the scheduling data of DCI 1, and since both DCIs are scheduling for the same data, in this case, it may also be referred to as the same DCI.

In addition, in describing the present disclosure below, transmission of the same PDCCH by multiple base stations may mean that one DCI is transmitted through one PDCCH candidate, but TRP 1 transmits some resources in which the PDCCH candidate is defined, and TRP 2 divides and transmits the remaining resources. For example, when TRP 1 and TRP 2 divide and transmit a PDCCH candidate corresponding to an aggregation level m1+m2, the PDCCH candidate is divided into PDCCH candidate 1 corresponding to aggregation level m1 and PDCCH candidate 2 corresponding to aggregation level m2, and TRP 1 transmits PDCCH candidate 1 and TRP 2 transmits PDCCH candidate 2 using different time/frequency resources. After receiving the PDCCH candidate 1 and the PDCCH candidate 2, the UE may generate a PDCCH candidate corresponding to the aggregation level m1+m2 and attempt DCI decoding.

Additionally, when the same DCI is divided and transmitted to several PDCCH candidates, there may be two implementation methods.

The first implementation method is a method in which DCI payload (control information bits+CRC) is encoded through one channel encoder (e.g., polar encoder), and the resulting coded bits are divided and transmitted by two TRPs. In this case, the entire DCI payload may be encoded in the coded bits transmitted by each TRP, or only some DCI payloads may be encoded. The second method divides the DCI payload (control information bits+CRC) into two (DCI 1 and DCI 2) and encodes each through a channel encoder (e.g., a polar encoder). After that, the two TRPs transmit coded bits corresponding to DCI 1 and coded bits corresponding to DCI 2, respectively.

In summary, multiple base stations (MTRPs) dividing/repeating the same PDCCH to transmit across multiple MOs may mean that 1) the coded DCI bits encoding the entire DCI content of the corresponding PDCCH are repeatedly transmitted through each MO for each base station (STRP), 2) the coded DCI bits encoding the entire DCI content of the corresponding PDCCH are divided into a plurality of parts, and different parts are transmitted for each base station (STRP) through each MO, or 3) the DCI content of the corresponding PDCCH is divided into a plurality of parts, different parts are separately encoded for each base station (STRP), and transmitted through each MO.

Repeatedly or divided transmission of the PDCCH may be understood to mean that the PDCCH is transmitted multiple times over several transmission occasions (TOs), and TO means a specific time/frequency resource unit in which the PDCCH is transmitted. For example, if the PDCCH is transmitted multiple times (to a specific RB) over slots 1, 2, 3, and 4, TO may mean each slot, if the PDCCH is transmitted multiple times (in a specific slot) over RB sets 1, 2, 3, and 4, TO may mean each RB set, or if the PDCCH is transmitted multiple times over different times and frequencies, TO may mean each time/frequency resource. In addition, a TCI state used for DMRS channel estimation may be set differently for each TO, and it may be assumed that a TO with a different TCI state is transmitted by different TRP/panel. A plurality of base stations repeatedly transmitting or dividing the PDCCH to transmit may mean that a PDCCH is transmitted across multiple TOs, and the union of the TCI states established in those TOs consists of two or more TCI states. For example, when the PDCCH is transmitted over TO 1, 2, 3, 4, TCI states 1, 2, 3, 4 may be configured in each of TO 1, 2, 3, 4, which means that TRP i cooperatively transmits PDCCH in TO i.

In addition, in describing the present disclosure below, the UE repeatedly transmitting the same PUSCH so that multiple base stations (i.e., MTRPs) receive it may mean that the same data is transmitted through a plurality of PUSCHs, and each PUSCH may be optimized and transmitted for uplink channels of different TRPs. For example, the UE may repeatedly transmit the same data through PUSCH 1 and 2, and the UE may transmit PUSCH 1 using UL TCI state 1 for TRP 1, and the UE may receive and transmit a value optimized for a channel of TRP 1 for link adaptation such as precoder/MCS as well. The UE may transmit PUSCH 2 by using UL TCI state 2 for TRP 2, and the UE may transmit by scheduling a value optimized for the channel of TRP 2 for link adaptation such as precoder/MCS. In this case, repeatedly transmitted PUSCHs 1 and 2 may be transmitted at different times to be TDM, FDM, or SDM.

In addition, in describing the present disclosure below, the UE dividing and transmitting the same PUSCH so that multiple base stations (i.e., MTRP) may receive it may mean that one data is transmitted through one PUSCH, but the resources allocated to the PUSCH are split and optimized for UL channels of different TRPs for transmission. For example, the UE may transmit the same data through 10 symbol PUSCH, and may transmit the first 5 symbols using UL TCI state 1 for TRP 1, and may receive and transmit a value optimized for link adaptation such as precoder/MCS and TRP 1 channel. The UE may transmit the remaining 5 symbols using UL TCI state 2 for TRP 2, and the UE may receive and transmit a value optimized for the channel of TRP 2 in link adaptation such as precoder/MCS. In the above example, one PUSCH may be divided into time resources to perform TDM transmission for TRP 1 and TRP 2, but it may be transmitted using FDM/SDM.

Similar to PUSCH transmission, the PUCCH may also be transmitted by the UE repeatedly transmitting the same PUCCH or dividing the same PUCCH to be received by a plurality of base stations (i.e., MTRP).

For a plurality of TOs indicated to the UE to repeatedly transmit or transmit PDCCH/PDSCH/PUSCH/PUCCH, each TO may be UL transmitted toward a specific TRP or DL received from a specific TRP. At this time, the UL TO (or TO of TRP 1) transmitted toward TRP 1 may mean TO using the first value of two spatial relations indicated to the UE, two UL TCIs, two UL power control parameters, or two PLRSs, and the UL TO transmitted towards TRP 2 (or TO of TRP 2) may mean TO using the second value of two spatial relations indicated to the UE, two UL TCIs, two UL power control parameters, or two PLRSs. Similarly for DL transmission, DL TO (or TO of TRP 1) transmitted by TRP 1 may mean TO using the first value among two DL TCI states (e.g., when two TCI states are configured in CORESET) indicated to the UE, and DL TO (or TO of TRP 2) transmitted by TRP 2 may mean a TO using the second value among two DL TCI states (e.g., when two TCI states are set in CORESET) indicated to the UE.

The proposal of the present disclosure may be extended and applied to various channels such as PUSCH/PUCCH/PDSCH/PDCCH.

The proposal of the present disclosure may be extended and applied to both the case of repeatedly transmitting the channel on different time/frequency/spatial resources and the case of transmitting the channel separately.

Precoder Determination Method for the Uplink PUSCH of the UE

The UE may use a non-codebook based method or a codebook based method as a method of determining a precoder for the uplink PUSCH.

In the case of the non-codebook-based method, N 1-port SRS resources may be configured in one SRS resource set (e.g., N is a natural number less than 5), and the UE uses the SRI field of DCI in the SRS resource set. One or more and (Lmax) or less SRS resources are indicated. As a result, the SRI field size is determined to be $$\mathrm{ceil}\!\left(\log 2\!\left(\sum\nolimits_{i=1}^{Lmax} C(N,\,i)\right)\right)\!.$$

C(N, i) means the number of cases in which i out of N are selected irrespective of the order. The number of SRS resources selected in this way is the same as the PUSCH rank, and the precoder (or beam) applied to the selected SRS resource is used as the PUSCH tx precoder (or beam).

In the case of the codebook-based method, rank/PMI is indicated to the UE through the TPMI field of DCI. In addition, the UE selects one of 2 (or 4) SRS resources defined in one SRS resource set through the 1 (or 2) bit SRI field of DCI, and UL PUSCH transmission is performed by applying the PMI indicated through the TPMI field to ports of the selected SRS resource. A specific UL beam (e.g., an analog beam) is equally applied to the ports of the SRS resource, and PMI is applied to the ports to which the specific UL beam is applied to generate a final precoder.

The number of bits of the SRI field may be determined as in Equation 4 below when 'txConfig', which is a higher layer parameter, is 'nonCodebook'.

$$\left\lceil \log_2\!\left(\sum_{k=1}^{\min\{L_{max},N_{SRS}\}} \binom{N_{SRS}}{k}\right)\right\rceil \qquad \text{[Equation 4]}$$

In Equation 4, $N_{SRS}$ is the number of SRS resources set in the SRS resource set configured by the higher layer parameter 'srs-ResourceSetToAddModList', and may be associated with 'nonCodebook', which is the value of the higher layer parameter 'usage'.

If the UE supports the operation using 'maxMIMO-Layers' and the higher layer parameter 'maxMIMO-Layers of PUSCH-ServingCellConfig' of the serving cell is configured, Lmax may be determined by the parameter. Otherwise, Lmax may be determined by the maximum number of PUSCH layers supported by the UE for the serving cell for non-codebook-based operation.

As another example, when 'txConfig', which is a higher layer parameter, is 'Codebook', the number of bits of the SRI field may be determined as in Equation 5 below.

$$\lceil \log_2(N_{SRS}) \rceil \qquad \text{[Equation 5]}$$

In Equation 5, $N_{SRS}$ is the number of SRS resources set in the SRS resource set configured by the higher layer parameter 'srs-ResourceSetToAddModList', and may be associated with 'Codebook', which is the value of the higher layer parameter 'usage'.

Additionally or alternatively, in the case of a non-codebook-based transmission method or when one antenna port is used in a codebook-based transmission method, the precoding information and the number of layers field may not be included in DCI. That is, in the case of a non-codebook-based transmission method or when one antenna port is used in a codebook-based transmission method, the number of bits of the precoding information and the number of layers field may be zero.

In other cases, the precoding information and the number of layers fields are included in the DCI and are used to indicate the TPMI and the number of layers. The size of the precoding information and the number of layers field may be determined according to the maximum rank and the number of layers.

Phase Tracking Reference Signal (PTRS) for PUSCH

In frequency range (FR) 2, since the influence of phase noise is large, the UE transmits the PTRS associated with a specific PUSCH DMRS port when transmitting the PUSCH. Here, the PTRS-related characteristics (e.g., the number of PTRS ports or time/frequency density, etc.) may be determined according to various values such as an uplink rank, MCS (modulation and coding scheme), or the number of allocated resource blocks (RBs). For example, when the uplink rank is 1, the maximum number of PTRS ports is one, and the time/frequency density for the PTRS port is determined according to the MCS and the number of allocated RBs. As another example, when the uplink rank is 2, the number of PTRS ports may be configured up to two.

The base station may indicate to the UE which DMRS port is associated with the PTRS through the PTRS-DMRS association field (Table 6 and Table 7) of the following DCI.

TABLE 6

| Value | DMRS port |
|---|---|
| 0 | 1st scheduled DMRS port |
| 1 | 2nd scheduled DMRS port |
| 2 | 3rd scheduled DMRS port |
| 3 | 4th scheduled DMRS port |

TABLE 7

| Value of MSB | DMRS port | Value of LSB | DMRS port |
|---|---|---|---|
| 0 | 1st DMRS port which shares PTRS port 0 | 0 | 1st DMRS port which shares PTRS port 1 |
| 1 | 2nd DMRS port which shares PTRS port 0 | 1 | 1st DMRS port which shares PTRS port 0 |

When the maximum number of PTRS ports is one by configuration information (e.g., 'maxNrofPort' included in 'PTRS-UplinkConfig') received through higher layer signaling (e.g., RRC signaling), Table 6 is applied. Table 6 discloses which DMRS port a single PTRS port is associated with. And, when the maximum number of PTRS ports is two according to the configuration information received through higher layer signaling, Table 7 is applied. Table 7 discloses which DMRS port is associated with each of the two PTRS ports.

Specifically, in the case of the non-codebook-based transmission method, a PTRS port index is configured for each SRS resource indicated through the SRI. When the PTRS port index configured in the indicated SRS resource is one (i.e., when the PTRS port index set to all SRS resources indicated by the SRI is set to 0 or 1 in common), the number of PTRS ports becomes one, and a DMRS port associated with the corresponding PTRS port may be indicated through Table 6. In other cases (e.g., when there are a plurality of PTRS port indexes), the number of PTRS ports becomes two, and DMRS ports associated with the two PTRS ports may be indicated through Table 7. In the latter case, the SRS port of the SRS resource with the PTRS port index configured to 0 becomes the DMRS port corresponding to the MSB in Table 7, and the SRS port of the SRS resource with the PTRS port index configured to 1 becomes the DMRS port corresponding to the LSB in Table 7.

In the case of a full coherent codebook in a codebook-based transmission method, the number of PTRS ports is one. In a non-coherent/partial coherent codebook, when the rank is 1, the number of PTRS ports is 1, and when the rank is 2 or more, the number of PTRS ports is configured to 1 or 2. When the number of PTRS ports is configured to 2, Table 7 is applied, MSB indicates one of two DMRS ports using PUSCH antenna ports 1000 and 1002, and LSB indicates one of two DMRS ports using PUSCH antenna ports 1001 and 1003.

Uplink Transmission Method Based on Phase Tracking Reference Signal (PTRS)-Demodulation Reference Signal (DMRS) Association Field The present disclosure relates to a method of transmitting and receiving an uplink based on a phase tracking reference signal-demodulation reference signal (PTRS-DMRS) association field.

Hereinafter, a method for the UE to perform uplink transmission based on the PTRS-DMRS association field in DCI will be described with reference to FIG. 8.

Figure 8:
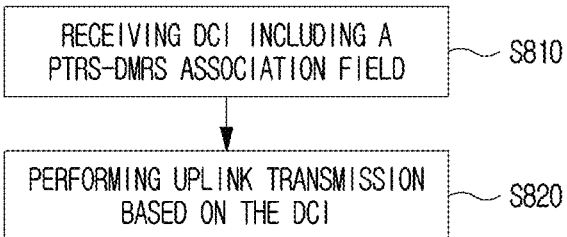
FIG. 8 is a diagram for describing an uplink transmission method of a terminal according to an embodiment of the present disclosure.

FIG. 8 is a flowchart illustrating an uplink transmission method of a UE in a wireless communication system to which the present disclosure may be applied.

In step S810, the UE may receive downlink control information (DCI) including the PTRS-DMRS association field from the base station.

The PTRS-DMRS association field may include information indicating an association relationship between a PTRS port and a DMRS port for each resource group. For example, the PTRS-DMRS related field may include first information related to the association between the PTRS port and the DMRS port for the first resource group and second information related to the association between the PTRS port and the DMRS port for the second resource group.

Here, the resource group may mean a specific resource unit through which uplink is transmitted. For example, the resource group may include at least one of transmission occasion (TO) group, SRS resource group indicated by DCI (e.g., a sounding reference signal resource indicator (SRI) field included in the DCI), a control resource set (CORESET) pool index, or a precoding matrix indicated by DCI (e.g., precoding information and number of layers field in DCI), but is not limited thereto.

And, one resource group may correspond to one transmission reception point (TRP). For example, the first resource group including at least one of a first TO group, a first SRS resource group indicated by DCI (e.g., first SRI field in DCI), a first CORESET poolindex, or a first precoding matrix indicated by DCI (e.g., the first precoding information and the number of layers field in DCI, etc.) may correspond to the first TRP. In addition, the second resource group including at least one of a second TO group, a second SRS resource group indicated by DCI (e.g., second SRI field in DCI), a second CORESET poolindex, or a second precoding matrix indicated by DCI (e.g., the second precoding information and the number of layers field in DCI, etc.) may correspond to the second TRP. However, this is only an embodiment, and one resource group may correspond to one or more TRPs.

The PTRS-DMRS association field may consist of a plurality of bits. A plurality of bits included in the PTRS-DMRS association field may indicate the association between the PTRS port and the DMRS port separately (or independently).

For example, the PTRS-DMRS association field may consist of 2 bits. In addition, a most significant bit (MSB) and a least significant bit (LSB) among the PTRS-DMRS association fields may separately/independently indicate association between PTRS and DMRS for each resource group. Specifically, the MSB of the 2 bits among the 2 bits may indicate one of the first information related to the association between the PTRS port and the DMRS port for the first resource group or the second information related to the association between the PTRS port and the DMRS port for the second resource group, the LSB among the 2 bits may indicate the other one of the first information or the second information. For example, if the resource group is TO group, MSB may be used to indicate information related to PTRS-DMRS association to be applied to the first TO group toward the first TRP, and the LSB may be used to indicate information related to the PTRS-DMRS association to be applied to the second TO group toward the second TRP.

Additionally or alternatively, the maximum rank of the uplink indicated/scheduled by DCI may be limited to 2, but is not limited thereto and may be indicated as 2 or more. Here, the uplink rank may mean the number of layers or the number of antenna ports. And, the rank of uplink transmission may be indicated based on one or more of the SRI field or precoding information and the number of layers field included in DCI.

In step S820, the UE may perform uplink transmission based on DCI.

Specifically, when transmitting the uplink for the first resource group, the UE may transmit the PTRS through the PTRS port associated with the DMRS port indicated by the first information. That is, uplink transmission for the first resource group may include PTRS transmission through a PTRS port associated with a DMRS port indicated by the first information. And, when transmitting the uplink for the second resource group, the UE may transmit the PTRS through the PTRS port associated with the DMRS port indicated by the second information. That is, the uplink transmission for the second resource group may include PTRS transmission through the PTRS port associated with the DMRS port indicated by the second information.

For example, it is assumed that the resource group is a TO group and the uplink transmission is PUSCH transmission. The UE may transmit a PTRS port associated with the DMRS port indicated by the first information together when transmitting the PUSCH in the first TO group toward the first TRP. And, when the UE transmits the PUSCH in the second TO group toward the second TRP, the PTRS port associated with the DMRS port indicated by the second information may be transmitted together.

Since the PTRS-DMRS association may be individually indicated for each TRP through the PTRS-DMRS association field on the DCI proposed in the present disclosure, the UE may transmit the PTRS through a specific layer with a good signal-to-noise ratio (SNR) for each TRP. Accordingly, the performance of estimating phase noise through PTRS may be improved.

Figure 9:
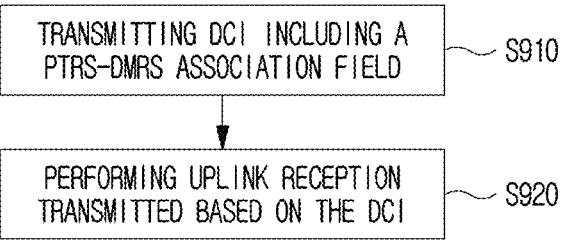
FIG. 9 is a diagram for describing an uplink reception method of a base station according to an embodiment of the present disclosure.

FIG. 9 is a flowchart illustrating an uplink reception method of a base station in a wireless communication system to which the present disclosure may be applied.

In step S910, the base station may transmit the DCI including the PTRS-DMRS association field to the UE.

The PTRS-DMRS association field may include information indicating an association relationship between a PTRS port and a DMRS port for each resource group. For example, the PTRS-DMRS association field may include first information related to the association between the PTRS port and the DMRS port for the first resource group and second information related to the association between the PTRS port and the DMRS port for the second resource group.

That is, the first resource group may include at least one of a first TO group, a first SRS resource group indicated by DCI (e.g., the first SRI field in DCI, etc.), a first CORESET poolindex, or a precoding matrix indicated by DCI (e.g., the first precoding information and the number of layers field in DCI, etc.), and the first resource group may correspond to a first TRP. The second resource group may include at least one of a second TO group, a second SRS resource group indicated by DCI (e.g., the second SRI field in DCI, etc.), a second CORESET poolindex, or a precoding matrix indicated by DCI (e.g., the second precoding information and the number of layers field in DCI, etc.), and the second resource group may correspond to a second TRP.

The PTRS-DMRS association field may consist of a plurality of bits. A plurality of bits included in the PTRS-DMRS association field may separately/independently indicate association between the PTRS port and the DMRS.

For example, the PTRS-DMRS association field may consist of 2 bits. In addition, MSB and LSB in the PTRS-DMRS association field may separately/independently indicate association between PTRS and DMRS for each resource group. Specifically, the MSB among 2 bits may indicate one of the first information related to the association between the PTRS port and the DMRS port for the first resource group or the second information related to the association between the PTRS port and the DMRS port for the second resource group, and the LSB among the 2 bits may indicate the other one of the first information or the second information. For example, if the resource group is TO group, MSB may be used to indicate information related to PTRS-DMRS association to be applied to the first TO group toward the first TRP and LSB may be used to indicate information related to the PTRS-DMRS association to be applied to the second TO group toward the second TRP.

Additionally or alternatively, the maximum rank of the uplink indicated/scheduled by DCI may be limited to 2, but is not limited thereto and may be indicated as 2 or more. Here, the uplink rank may mean the number of layers or the number of antenna ports. And, the rank of uplink transmission may be indicated based on one or more of the SRI field included in DCI or the precoding information and the number of layers field.

In step S920, the base station may receive an uplink transmitted based on DCI.

Specifically, when receiving the uplink for the first resource group, the base station may receive a PTRS port associated with the DMRS port indicated by the first information together. That is, the uplink transmission for the first resource group may include the PTRS port associated with the DMRS port indicated by the first information. In addition, the base station may receive a PTRS port associated with the DMRS port indicated by the second information when receiving the uplink for the second resource group. That is, the uplink transmission for the second resource group may include the PTRS port associated with the DMRS port indicated by the second information.

For example, when the resource group is TO group and the uplink transmission is PUSCH transmission, the first TRP may receive the PUSCH in the first TO group and the PTRS associated with the DMRS port indicated by the first information together. And, the second TRP may transmit the PUSCH and the PTRS associated with the DMRS port indicated by the second information in the second TO group together.

Hereinafter, specific examples of uplink transmission based on the PTRS-DMRS association field included in DCI according to the present disclosure will be described.

In the case of the MTRP PUSCH transmission method, since PUSCH is transmitted toward different TRPs for each TO, beam/precoder/rank/SRS antenna port/spatial relation info used for PUSCH transmission for each TO may be configured differently. As a result, the PUSCH DMRS port having the strongest channel may be different for each TO.

For example, it is assumed that a rank 2 PUSCH is repeatedly transmitted by performing time division multiplexing (TDM) on two TOs. In the first TO toward TRP 1 (that is, when using the first value of the two spatial relation indicated, uplink TCI, or PLRS), the first DMRS port may have better channel strength than the second DMRS port. And, in the second TO toward TRP 2 (that is, using the second value of the two indicated spatial relationships, uplink TCI, or PLRS), the second DMRS port may have better channel strength than the first DMRS port. Here, in the first TO, it is preferable that the first DMRS port is associated with (or correspond to) PTRS, and in the second TO, it is preferable that the second DMRS port is associated with (or correspond to) PTRS. However, according to the existing UE operation, since there is only one association information between the DMRS port indicated by the DCI and the PTRS, the PTRS is inevitably associated with the DMRS port indicated by the DCI regardless of the TO.

Embodiment 1-1

Embodiment 1-1 is an embodiment related to a method of differently indicating information related to association between DMRS and PTRS for each TO in order to solve the problem that PTRS is continuously associated with the DMRS port indicated by DCI regardless of TO In order to solve the above problem, the PTRS-DMRS association to be used in the TO toward TRP 1 and the PTRS-DMRS association to be used in the TO toward TRP 2 may be independently indicated by extending the PTRS-DMRS association field. For example, a 4-bit PTRS-DMRS association field may be generated by extending the 2-bit PTRS-DMRS association field to two. In addition, 2 bits of the 4-bit PTRS-DMRS association field may indicate the PTRS-DMRS association to be used in the TO toward TPR 1, and the remaining 2 bits may indicate the PTRS-DMRS association to be used in the TO toward the TRP 2.

Additionally or alternatively, in one PTRS-DMRS association field, the association information of the TO toward TRP 1 and the association information of the TO toward the TRP 2 may be encoded as one code point. Accordingly, the base station may indicate all of the association information between the PTRS-DMRS through one code point in which the association information is encoded. For example, the PTRS-DMRS association used in the TO toward each TRP may be configured in a form in which the PTRS-DMRS association is configured/indicated for each CORESET pool index (/CORESET group ID/index) corresponding to each TO.

Additionally or alternatively, the PUSCH rank may be different for each TO. In this case, the PTRS-DMRS association table and the number of PTRSs may vary according to the rank of each TO. For example, if rank 1 transmission is performed in TO 1 and rank 2 transmission is performed in TO 2, in TO 1, the association between PTRS and DMRS is configured/indicated according to Table 6, and in TO 2, the association between PTRS and DMRS is configured/indicated according to Table 7.

In addition, since SRS resources used in each TO may be different in the non-codebook method, the PTRS of a specific TO is determined with respect to the SRS resources used in the corresponding TO. Even in the codebook method, since the SRS resource and PMI/codebook used in each TO may be different, the PTRS of a specific TO is determined for the SRS resource and PMI/codebook used in the corresponding TO.

When the above-described method is applied, since the correlation between the DMRS and the PTRS may be differently indicated for each TO toward each TPR, the PTRS may be transmitted through a specific layer having a good SNR for each TRP. On the other hand, as the number of bits of PTRS-DMRS association information of DCI increases, DCI overhead may increase.

Embodiment 1-2

Embodiment 1-2 is an embodiment related to a method of indicating association information between DMRS and PTRS for each TO without increasing DCI overhead.

In order not to increase DCI overhead, the PTRS-DMRS association field of DCI may be maintained and the same PTRS-DMRS association indication value may be applied to all TOs. In addition, the TRP (e.g., TRP 1) to which the PTRS-DMRS association value indicated by the DCI is applied may be determined based on the CORESET pool index (e.g., at least one of a specific CORESETpoolindex (e.g., 0) or the lowest CORESETPoolindex) corresponding to the CORESET to which the DCI is transmitted. At this time, it is possible to increase the time/frequency PTRS density in the TO toward TRP 2.

Specifically, the base station uses the PTRS-DMRS association field to select a DMRS port with a strong channel in the TO toward TRP 1, and also uses the selected DMRS port for PTRS transmission in the TO toward TRP 2, so, in the TO toward TRP 2, the reception power of the PTRS may not be strong enough.

In order to solve the situation in which the reception power of the PTRS is not strong enough in the TO toward TRP 2, the PTRS time/frequency density may be further increased in the TO toward the TRP 2 in which the DMRS port association is not optimized. The PTRS time/frequency density may be determined by the number of scheduled RBs and the MCS used by the TO toward TRP 2. That is, given a specific MCS and a scheduled RB, a corresponding time/frequency density may be determined.

For example, the PTRS time density may increase as the MCS is large, and the PTRS frequency density may decrease as the number of scheduled RBs increases. PTRS may be transmitted with a greater time/frequency density than the time/frequency density determined based on the MCS and the scheduled RB. That is, in the TO toward TRP 2, PTRS may be transmitted at a density one step higher than the density determined based on a specific MCS and a scheduled RB, or it may be promised to transmit PTRS at the highest density assuming the worst case.

Embodiment 1-3

Embodiment 1-3 is an embodiment of a method of indicating both PTRS-DMRS association information to be applied to TO of TRP 1 and PTRS-DMRS association information to be applied to TO of TRP 2 without an increase in DCI overhead.

When MTRP (URLLC) PUSCH transmission is recognized, the UE may divide the 2-bit PTRS-DMRS association field into two 1-bit fields, may use the MSB 1 bit as PTRS-DMRS related information to be applied to the TO of TRP 1, and may use the LSB 1 bit as PTRS-DMRS related information to be applied to the TO of TRP 2. Alternatively, MSB 1 bit may be used as PTRS-DMRS association information to be applied to TO of TRP 2, and LSB 1 bit may be used as PTRS-DMRS association information to be applied to TO of TRP1.

For example, when the PUSCH rank to be transmitted in each TO is 2 and the number of PTRS ports is one, the DMRS port associated with the PTRS port among the two DMRS ports may be indicated through a 1-bit PTRS-DMRS association field. Since the MTRP PUSCH transmission method is a transmission method for the purpose of improving reliability, it is highly likely that the maximum rank is limited to 2 in each TO. If the maximum rank in each TO is limited to 2, since the maximum number of DMRS ports of each TO is 2 or less, if the number of PTRS ports is one, the DMRS port associated with the PTRS port may be indicated through the 1-bit PTRS-DMRS association field.

And, if the number of DMRS ports is 2 and the number of PTRS ports is 2 in each TO, since DMRS and PTRS are mapped 1:1 (e.g., the first DMRS port is mapped to the first PTRS port, and the second DMRS port is mapped to the second PTRS port), the UE may promise to ignore the PTRS-DMRS association field or to map the DMRS port indicated by the 1-bit PTRS-DMRS association field to the first PTRS port and map the remaining DMRS ports to the second PTRS port. Alternatively, the UE may use the PTRS-DMRS association field for another purpose for MTRP PUSCH transmission.

The UE may recognize MTRP (URLLC) PUSCH transmission by receiving at least one of a plurality of uplink beam information (e.g., UL TCI state or spatial relation information) or a plurality of UL TX power information through one DCI.

Additionally or alternatively, in the case of the MTRP PUSCH transmission method, the maximum rank of each TO may be limited to 1. In this case, since there is only one DMRS port, the 2-bit PTRS-DMRS association field may not be needed.

Specifically, when the MTRP PUSCH transmission method and the STRP PUSCH transmission method are dynamically indicated/determined through DCI, the 2-bit PTRS-DMRS association field may be configured to be used in the STRP PUSCH transmission method. However, if the MTRP PUSCH transmission scheme is dynamically indicated, since the 2-bit PTRS-DMRS association field is unnecessary, the corresponding field may be used for other purposes for MTRP PUSCH transmission. For example, the 2-bit PTRS-DMRS association field may be used to indicate the SRI/TPMI/power control parameter/path loss RS/UL TCI to be applied to the TO of TRP 2. At this time, the SRI/TPMI/power control parameter/path loss RS/UL TCI indication method to be applied to the TO of TRP 1 may follow the method of the existing UE.

Embodiment 2

Embodiment 2 is an embodiment related to a method of dividing SRS resources indicated by SRI into SRS resource groups directed to each TRP, and determining the number of PTRS ports for each SRS resource group based on a PTRS port index corresponding to the separated SRS resource group.

According to the existing UE method, the maximum number of UL PTRS ports may be configured to 1 or 2 through RRC signaling. In addition, the actual number of PTRS ports may be determined according to the type of UL transmission mode (e.g., a codebook-based UL transmission mode or a non-codebook-based UL transmission mode, etc.) and detailed configuration. If the maximum number of UL PTRS ports is 1, the actual number of PTRS ports may be 1 or 0, and if the maximum number of UL PTRS ports is two, the actual number of PTRS ports may be two, one, or zero.

In the non-codebook-based UL transmission mode, the SRS resource toward TRP 1 and the SRS resource toward TRP 2 may be indicated together through one SRI field, and in this case, if the number of PTRS ports is determined by applying the existing method, a malfunction may occur. For example, when the PTRS port index is configured to 0 in the SRS resource toward TRP 1 (i.e., SRS resource used by TO of TRP 1), and the PTRS port index is configured to 1 in the SRS resource toward TRP 2 (i.e., SRS resource used by TO of TRP 2), when the existing method is applied, since both PTRS port indexes 0 and 1 of the SRS resource(s) indicated by the SRI exist, the number of PTRS ports is configured to 2.

However, the PTRS transmitted from the TO of TRP 1 and the PTRS transmitted from the TO of TRP 2 are independent of each other. Therefore, a plurality of SRS resources indicated by SRI are first divided into an SRS resource toward TRP 1 (i.e., SRS resource group 1) and an SRS resource toward TRP 2 (i.e., SRS resource group 2), and depending on the number of PTRS port indexes within each group, the number of PTRS ports for each group should be determined.

For example, SRS resource 1 toward TRP 1 and SRS resources 2 and 3 toward TRP 2 may be indicated through the SRI field of DCI, and SRS resource 1 may be configured to PTRS port index 0, and SRS resources 2 and 3 may be configured to PTRS port index 1. For example, a PTRS port index (ptrs-portIndex) may be configured for each SRS resource. Here, the number of PTRS ports transmitted in the TO of TRP 1 may be determined to be one, and the number of PTRS ports transmitted in the TO of TRP 2 may be determined to be one. In addition, in the TO of TRP 1, the PTRS density may be determined according to the number of MCS/scheduled RBs used in the TO, and in the TO of TRP 2, the PTRS density may be determined according to the number of MCS/scheduled RBs used in the TO. In addition, rate matching of PUSCH in the PTRS RE seat may be also independently determined in the TO of each TRP. That is, the number of PTRS ports/density/RE positions may be independently determined in the TO of each TRP, and in the case of PTRS and PUSCH transmitted in TOs of different TRPs, PUSCH rate matching may not be performed.

And, like the operation of the existing UE, the SRS resource group may be indicated to the terminal as an SRS resource set. For example, a plurality of SRS resource sets in SRS configuration information (e.g., 'SRS-Config') may be configured, and a TRP corresponding to each SRS resource set may be configured/indicated based on a TRP ID or CORESETpoolindex. Alternatively, for example, when a panel index (or beam group index) is introduced, an SRS resource group may be configured according to a panel index associated with or mapped to the SRS resource. For example, it may be assumed that SRS resources associated with the same panel index belong to the same group, and SRS resources associated with different panel indexes belong to different groups.

Alternatively, the SRS resource group may be identified by a PTRS port index configured in the SRS resource. For example, SRS resources in which the PTRS port index is configured to 0 may be configured in SRS resource group 1, and SRS resources in which the PTRS port index is configured to 1 may be configured in SRS resource group 2.

When the base station configures a plurality of (e.g., N) TOs for repeated PUSCH transmission to the UE (e.g. via RRC signaling or DCI), the UE may determine rank and transmit beam/port by using SRS resource belonging to SRS resource group 1 among SRS resources indicated through SRI in TO of TRP 1 among a plurality of TOs. In addition, the UE determines rank and transmit beam/port by using the SRS resource belonging to SRS resource group 2 among the SRS resources indicated through the SRI in the TO of TRP 2 among the plurality of TOs. For example, when SRS resources #0, 1, 2, 3 are mapped to PTRS ports #0, 0, 1, 1, it is assumed that the base station indicates SRI #0, 1, 2 as the SRI field of DCI. Here, the UE performs transmission of rank 2 PUSCH and PTRS port #0 using SRS resources #0, 1 in TO of TRP 1, and performs PTRS port #1 and rank 1 PUSCH transmission using SRS resource #2 for TO of TRP 2.

Among the plurality of (e.g., N) TOs configured above, the TO of TRP 1 and TO of TRP 2 may be indicated by the base station to the UE in a mapping pattern or may be promised by a specific mapping pattern. For example, if 4 TOs are configured, TO 1, 2, 3, 4 may be configured to the TO of TRP 1, TRP 2, TRP 1, TRP 2, respectively (i.e., TRP is mapped alternately from the front TO), or may be configured to the TO of TRP 1, TRP 1, TRP 2 TRP 2 (i.e., the TO in the front half is mapped to TRP 1 and the other TO is mapped to the TO in TRP2).

Additionally or alternatively, when each TO is defined with different time/frequency resources, the PTRS port index applied to each TO may not need to be different. Therefore, the TO of TRP 1 and the TO of TRP 2 may transmit the PTRS port using the same PTRS port index. However, the DMRS port associated with the PTRS port may be defined differently for each TO.

Even when a plurality of SRI fields are configured to designate SRS resources directed to each TRP, the number of PTRS ports may be determined by determining the PTRS port index of the SRS resource indicated for each SRI field.

Embodiment 3

Embodiment 3 is an embodiment of a method for dividing a precoding vector of a precoding matrix indicated by one TPMI field into two vector groups in a codebook-based transmission method and determining the number of PTRSs through a rank for each vector group.

In the case of the codebook-based transmission mode, both the TPMI used in the TO toward TRP 1 and the TPMI used in the TO toward TRP 2 may be indicated through one TPMI field. For example, a precoding vector of a rank n (here, n=n1+n2) precoding matrix indicated by one TPMI field may be divided into two (sub) groups (e.g., a rank n1 precoding vector group used in the TO of TRP 1 (e.g., the first precoding vector group) and a rank n2 precoding vector group used in the TO of TRP 2 (e.g., the second precoding vector group)).

In this case, the number of PTRS ports should be determined based on the rank (i.e., rank n1 or n2) for each precoding vector group, not based on rank n. That is, the number of ports of PTRS toward TRP 1 may be calculated based on rank n1 corresponding to the precoding vector group used in TO of TRP 1, and the number of ports of PTRS toward TRP 2 may be calculated based on rank n2 corresponding to the precoding vector group used in the TO of TRP 2.

In addition, even if the rank of the precoding vector group i (e.g., i is 1 or 2) used in the TO toward TRP i is 2 or more, when a non-zero element of a precoding vector belonging to a corresponding precoding vector group exists only in PUSCH antenna ports 1000 and 1002, the number of PTRS ports is assumed to be one in the corresponding TO. The reason for this assumption is that, when the partial coherent codebook is configured, coherence is guaranteed between PUSCH antenna ports 1000 and 1002, so that phase tracking is possible with one PTRS port. Similarly, when the non-zero element of the precoding vector belonging to the precoding vector group exists only in PUSCH antenna ports 1001 and 1003, it is assumed that the number of PTRS ports is one in the corresponding TO.

Alternatively, when transmitting the MTRP PUSCH, the PUSCH toward each TRP may be limited to use a coherent PUSCH antenna port, and in this case, one PTRS port may always be used regardless of the PUSCH rank of each TRP. Therefore, when two PTRS ports are indicated and a plurality of TOs for MTRP PUSCH are configured, the first PTRS port may be transmitted in the TO of TRP 1, and the second PTRS port may be transmitted in the TO of TRP 2. At this time, the first PTRS port may indicate one of the DMRS ports transmitted in the TO of TRP 1 by using the MSB 1 bit of the PTRS-DMRS association field of DCI, and the second PTRS port may indicate one of the DMRS ports transmitted in the TO of TRP 2 by using the LSB 1 bit.

Even when a plurality of TPMI fields are configured for TPMI designation toward each TRP, the number of PTRS ports may be determined by identifying the rank and precoding matrix indicated for each TPMI field.

Additionally or alternatively, although the embodiment described above (e.g., at least one of embodiments 1-1, 1-2, 1-3, 2, or 3) exemplifies PUSCH transmission for 2 TRPs, it may be extended and applied to PUSCH transmission method toward two or more TRPs. For example, assuming a PUSCH transmission method toward N TRPs, N PTRSs for each of the N TRPs may be associated with different DMRS ports. In addition, the number and density of ports for each of the N PTRSs may be configured differently depending on the TO in which each PTRS is transmitted.

Embodiment 4

In the case of the non-codebook-based transmission method, when the maximum number of PTRS ports (i.e., 'maxNroPorts') is configured to 1, association information between PTRS and DMRS is indicated through Table 6. If the maximum number of PTRS ports is configured to 2, the association information between PTRS and DMRS is indicated as described below.

First, each SRS resource indicated through an SRS resource indicator (SRI) may be configured (mapped) to PTRS port index 0 or 1 in advance. SRS resources having the same set PTRS port index among the indicated SRS resources may be grouped together. In addition, through Table 7, one of the DMRS ports corresponding to the first SRS resource group (i.e., SRS resources for which the PTRS port index is configured to 0) may be indicated as PTRS port 0, and one of DMRS ports corresponding to the second SRS resource group (i.e., SRS resources for which the PTRS port index is set to 1) may be indicated as PTRS port 1.

In the codebook-based transmission method, when configured as a full coherent codebook, the maximum number of PTRS ports may be indicated as 1, and association information between PTRS and DMRS may be indicated through Table 6.

In the codebook-based transmission method, when a non-coherent/partially coherent codebook is configured and the maximum number of PTRS ports is indicated as 2, association information between PTRS and DMRS may be indicated through Table 7. For example, the MSB indicates one of the DMRS ports using the PUSCH antenna ports 1000 and 1002, and the LSB indicates one of the DMRS ports using the PUSCH antenna ports 1001 and 1003.

When the repeatedly transmitted MTRP PUSCH is transmitted in rank 3 or 4 in each TO, in order to indicate PTRS-DMRS association information of a PUSCH (i.e., TRP 1 PUSCH) transmitted using transmission RS 1 toward TRP 1 (i.e., transmitted using spatial relation RS 1) and PTRS-DMRS association information of a PUSCH (i.e., TRP 2 PUSCH) transmitted toward TRP 2 (i.e., transmitted using spatial relation RS 2), an embodiment described below may be proposed. Here, the case of rank 3 has been described as an example for convenience of explanation of the present disclosure, but it goes without saying that the case of rank 4 may be extended and applied.

Embodiment 4-1

When PTRS information is indicated through Table 6 as the maximum number of PTRS ports is configured to 1, PTRS-DMRS association may be indicated through a method to be described later.

By extending Example 1-3, MSB 1 bit of the 2-bit PTRS-DMRS association field may be used for the PUSCH of TRP 1, and the LSB 1 bit may be used for the PUSCH of TRP 2. However, since the association information should be indicated through 1 bit, one of the first layer (i.e., the first DMRS port) and the second layer (i.e., the second DMRS port) may indicate association with the PTRS except for the third layer among three layers of the PUSCH (i.e., 3 DMRS ports).

Due to the above-described method, if the third DMRS port is the strongest port, the PTRS cannot be associated with the strongest port and may be associated with the second strongest port. The above-described method may ensure the phase tracking performance of the PTRS by preventing the PTRS from being associated with the weakest DMRS port. The rank 4 PUSCH may be applied similarly to the rank 3 PUSCH.

Additionally or alternatively, when PTRS information is indicated using Table 7 as the maximum number of PTRS ports is configured to 2, PTRS-DMRS association may be indicated through a method described below.

By extending embodiment 1-3, MSB 1 bit of the 2-bit PTRS-DMRS association field may be used for the PUSCH of TRP 1 and the LSB 1 bit may be used for the PUSCH of TRP 2. However, since the related information must be indicated through 1 bit, (Rank 3), for a single PTRS port shared by a plurality of DMRS ports among three DMRS ports of a PUSCH, 1 bit may be used for indicating association between one of the plurality of DMRS ports and the single PTRS port.

For example, it is assumed that DMRS ports 0, 1, and 2 are indicated, DMRS ports 0 and 1 share PTRS port 0, and DMRS port 2 corresponds to PTRS port 1 (e.g., in the non-codebook-based PUSCH, when the PTRS port index of the SRS resource corresponding to DMRS ports 0 and 1 is configured to 0, and the PTRS port index of the SRS resource corresponding to the DMRS port 2 is configured to 1, or in the codebook-based PUSCH, when DMRS ports 0 and 1 are transmitted through PUSCH ports 1000 and 1002 and DMRS port 2 is transmitted through PUSCH ports 1001 and 1003). In this case, the 1 bit is used to indicate association between one of DMRS ports 0 and 1 and PTRS port 0. Since DMRS port 2 is the only DMRS port that shares PTRS port 1, the association between PTRS port 1 and DMRS 2 is self-evident, so additional indication through DCI are unnecessary. Therefore, in the case of rank 3, even if the association information between the PTRS and the DMRS is indicated through one bit per TRP, the association operation between the PTRS and the DMRS may be optimized as described above.

In the case of the rank 4 PUSCH, unlike the rank 3 PUSCH, there are two DMRS ports sharing PTRS port 0 and two DMRS ports sharing PTRS port 1. Therefore, when indicating association between PTRS and DMRS using 1 bit, PTRS port 0 may be associated with an i-th DMRS port among two DMRS ports sharing PTRS port 0, and PTRS port 1 may be associated with an i-th DMRS port among two DMRS ports sharing PTRS port 1. As a result, various association relationships such as PTRS port 0 associated with the first DMRS port and PTRS port 1 associated with the second DMRS port may not be supported.

Due to the above-described method, if the first DMRS port among the DMRS ports sharing PTRS port 0 is the strongest port and the second DMRS port among the DMRS ports sharing PTRS port 1 is the strongest port, neither PTRS port may be associated with the strongest port. Rather, in the above-described case, as one PTRS port is associated with the weakest port, performance degradation may occur.

Embodiment 4-2

When PTRS information is indicated through Table 6 as the maximum number of PTRS ports is configured to 1, PTRS-DMRS association is indicated through a method to be described later.

The PTRS-DMRS association field may be extended to indicate association information between PTRS and DMRS. For example, it is assumed that 1 bit is added to the existing 2-bit PTRS-DMRS association field. The existing 2-bit PTRS-DMRS association field may be used for the PUSCH of TRP 1 (in the same manner as before), and the added 1-bit PTRS-DMRS association field may be used for the PUSCH of TRP 2. If the i-th DMRS port is indicated through the existing 2-bit field, it may indicate whether the PTRS of TRP 2 is related to the i-th DMRS port or to the (i+1)-th DMRS port through the added 1-bit field. At this time, if the i+1-th DMRS port does not exist, circular indexing may be applied to indicate the first DMRS port.

For example, the strongest DMRS port (e.g., the first DMRS port) of the TRP 1 PUSCH may be associated with the PTRS through the existing 2-bit PTRS-DMRS association field. And, a better (e.g., stronger) port of the first DMRS port and the second DMRS port of the TRP 2 PUSCH through the added 1 bit may be associated with the PTRS. Unlike Embodiment 4-1, in Embodiment 4-2, the PTRS of TRP 1 has the advantage that it may always be associated with the strongest DMRS port.

Additionally or alternatively, when PTRS information is indicated through Table 7 as the maximum number of PTRS ports is configured to 2, PTRS-DMRS association may be indicated through a method to be described later.

The existing 2-bit PTRS-DMRS association field may be used for the PUSCH of TRP 1 in the same manner as before, and the added 1-bit PTRS-DMRS association field may be used for the PUSCH of TRP 2. Through the existing 2-bit PTRS-DMRS association field, an i-th DMRS port may be indicated among DMRS ports sharing PTRS port 0 and a j-th DMRS port may be indicated among DMRS ports sharing PTRS port 1. When the value according to the added 1-bit field is 0, among the DMRS ports sharing PTRS 0 of TRP 2, an i-th DMRS port may be associated with PTRS 0, and among the DMRS ports sharing PTRS 1 of TRP 2, the j-th DMRS port may be associated with PTRS 1. That is, it follows the PTRS-DMRS association of TRP 1. And, when the value according to the added 1-bit field is 1, among the DMRS ports sharing PTRS 0 of TRP 2, the (i+1)-th DMRS port is associated with PTRS 0, and among the DMRS ports sharing PTRS 1 of TRP 2, the (j+1)-th DMRS port may be associated with PTRS 1. In this case, when the i+1 or j+1-th DMRS port does not exist, circular indexing may be applied to indicate the first DMRS port again.

Unlike Embodiment 4-1, the PTRS of TRP 1 in Example 4-2 has the advantage that it may always be associated with the strongest DMRS port.

When the N-bit PTRS-DMRS association field is configured, only some of the 2N codepoints are used and the rest are reserved according to the actual PUSCH rank and the DMRS port sharing the same PTRS port. At this time, the reserved codepoint may be utilized for various purposes for MTRP transmission. For example, the reserved code point may be used to indicate dynamic switching between STRP/MTRP transmission.

Embodiment 4-3

Among the 2-bit PTRS-DMRS association fields, 1-bit MSB is used for PTRS DMRS association of TRP 1, and 1-bit LSB is used for PTRS DMRS association of TRP 2. At this time, the 1-bit MSB is used to indicate the DMRS port group of the DMRS port used for TRP 1 PUSCH transmission. DMRS ports within the same group may be considered to be transmitted on the same panel.

Additionally or alternatively, DMRS ports may be grouped in various ways. For example, the base station may indicate the UE to group the DMRS ports in advance, or DMRS port grouping may be performed using a specific rule.

For example, a DMRS port transmitted using PUSCH ports 1000 and 1002 may be defined as group 1, and a DMRS port transmitted using PUSCH ports 1001 and 1003 may be defined as group 2. As another example, a DMRS port corresponding to an SRS resource in which the PTRS port index is configured to 0 may be defined as group 1, and a DMRS port corresponding to an SRS resource in which the PTRS port index is configured to 1 may be defined as group 2.

When one of two groups is selected through 1-bit MSB and there are multiple DMRS ports in the selected group, one port selected using a specific rule may be associated with PTRS. For example, the lowest index (lowest index) DMRS port or the highest index (highest index) DMRS port may be associated with the PTRS. Alternatively, the UE may select an arbitrary DMRS port in the group to be associated with the PTRS, and the base station may determine which DMRS port in the group is associated with the PTRS through blind detection.

Here, when a group has a 1:1 correspondence with a panel, selecting a group has the same meaning as selecting a panel. That is, DMRS ports are transmitted toward TRP 1 using two panels, and a panel having a better channel may be selected among the two panels, and the DMRS port and PTRS in the selected panel may be associated. The PTRS-DMRS association of TRP 2 may also be indicated using a 1-bit LSB similarly through the above-described method.

Embodiment 4-4

Assume the Maximum Number of PTRS Ports Between MTRP PUSCH Non-Repetition (Non-Repetition) and MTRP PUSCH Repetition (Repetition)

In the case of the operation of the existing terminal, in consideration of two panel terminals having different phase noises for each panel, up to two PTRS ports are supported. For example, when the UE transmits the PUSCH in a plurality of ranks, it may transmit using both panels. Here, since layers transmitted through panel 1 have the same phase noise, phase noise information may be estimated through PTRS port 0, and since layers transmitted through panel 2 have the same phase noise, phase noise information may be estimated through the PTRS port 1.

The operation of the UE may be applied in a situation in which some layers are transmitted as TRP 1 through panel 1 and the remaining layers are transmitted as TRP 2 through panel 2 in an MTRP PUSCH environment. Alternatively, the operation of the UE may be applied in a situation in which some layers are transmitted using UL spatial relation RS 1 or UL beam 1 and the remaining layers are transmitted using UL spatial relation RS 2 or UL beam 2 in the MTRP PUSCH environment.

The MTRP PUSCH transmission method is not repeated transmission of the same transport block (TB), but a non-repetition MTRP PUSCH method in which a portion of one TB is transmitted as TRP 1 through some layers and the remaining portion is transmitted as TRP 2 through the remaining layers. That is, in MTRP PUSCH transmission, the case where the number of repetitions is configured to 1 is called MTRP PUSCH non-repetition, and the case where the number of repetitions is configured to 2 or more is called MTRP PUSCH repetition.

Unlike MTRP PUSCH non-repetition, in MTRP PUSCH repetition, panel use may be limited, so in PUSCH TO transmitted toward TRP 1, the UE can transmit PUSCH through panel 1, and in PUSCH TO transmitted toward TRP 2, the UE can transmit PUSCH through panel 2. In this case, since only one panel is used in one TO, one PTRS port is sufficient.

That is, even if the maximum number of PTRS ports (maxNrofPorts) is configured to two through the RRC configuration, when MTRP PUSCH repetition is scheduled, it is assumed that the maximum number of PTRS ports is 1 and PTRS DMRS association information should be identified through Table 6. On the other hand, when MTRP PUSCH non-repetition is scheduled, it is assumed that the maximum number of PTRS ports is 2, and PTRS DMRS association information should be identified using Table 7. MTRP PUSCH non-repetition and MTRP PUSCH repetition may be dynamically switched, and when the maximum number of PTRS ports is configured to 2 through RRC configuration, in MTRP PUSCH non-repetition, the maximum number of PTRS ports is 2, but in MTRP PUSCH repetition, the maximum number of PTRS ports is no longer valid, and the UE may assume that the maximum number of PTRS ports is 1. Similar to MTRP PUSCH repetition, even in the case of STRP PUSCH repetition, it may be limited to use only one panel, in this case, like the MTRP PUSCH repetition, it may be assumed that the maximum number of PTRS ports is 1.

Assume the Maximum Number of PTRS Ports (maxNrof-Ports) Between STRP PUSCH Repetition and MTRP PUSCH Repetition According to the existing UE operation, the maximum number of PTRS ports in STRP PUSCH repeated transmission (i.e., a method of transmitting the same TB over several TOs through one spatial relation RS) may be configured to 1 or 2. When the maximum number of PTRS ports is 1 and 2, association information between PTRS and DMRS may be indicated through Tables 6 and 7, respectively. STRP PUSCH repetition and MTRP PUSCH repetition may be switched dynamically, and when the maximum number of PTRS ports is configured to 2 through RRC configuration, in STRP PUSCH repetition, it may be valid that the maximum number of PTRS ports is 2 as before.

However, in MTRP PUSCH repetition, the maximum number of PTRS ports of 2 is no longer valid, and the UE assumes that the maximum number of PTRS ports is 1, and may determine the association information between PTRS and DMRS through Table 6.

Extend to Single DCI Based Multi-CC Scheduling

A method of simultaneously scheduling PUSCHs transmitted from a plurality of carrier components (CCs) with a single DCI (single DCI) (i.e., a single DCI-based multi-CC scheduling method) may be introduced.

When a method of scheduling PUSCHs transmitted from a plurality of CCs at once using a single DCI is applied, an issue similar to the MTRP PUSCH repeated transmission method using a single DCI may occur. In the case of repeated MTRP PUSCH transmission using a single DCI, the PTRS DMRS association indication for the PUSCH of TRP 1 and the PTRS DMRS association indication for the PUSCH of TRP 2 must be simultaneously performed through the corresponding DCI. To this end, various embodiments of the present disclosure may be utilized. Similarly, in a single DCI-based multi-CC scheduling method, PTRS-DMRS association of each PUSCH should be simultaneously indicated through one DCI, and various embodiments of the present disclosure may be extended.

Figure 10:
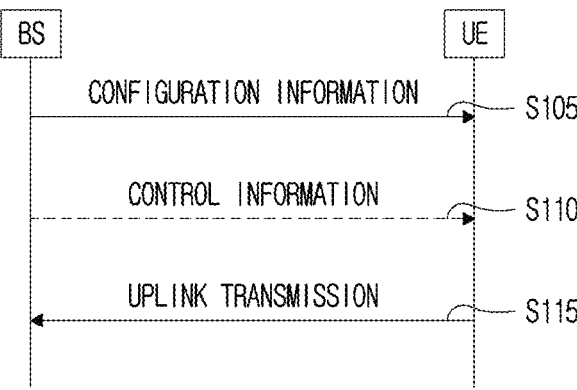
FIG. 10 is a diagram for describing a signaling procedure of a network side and a terminal according to the present disclosure.

FIG. 10 is a diagram for describing a signaling procedure of the network side and the UE according to the present disclosure.

FIG. 10 represents an example of signaling between UE and a network side to which the above-described examples of the present disclosure (e.g., embodiment 1-1/embodiment 1-2/embodiment 1-3/embodiment 2/embodiment 3/embodiment 4-1/embodiment 4-2/embodiment 4-3/embodiment 4-4, etc.) may be applied. Here, UE/a network side is illustrative and may be applied by being substituted with a variety of devices as described by referring to FIG. 11. FIG. 10 is for convenience of description, and it does not limit a scope of the present disclosure. In addition, some step(s) shown in FIG. 10 may be omitted according to a situation and/or a configuration, etc. In addition, the above-described uplink transmission and reception operation, a MTRP-related operation, etc. may be referred to or used for an operation of a network side/UE in FIG. 10.

In the following description, a network side may be one base station including a plurality of TRPs or may be one cell including a plurality of TRPs. Alternatively, a network side may include a plurality of RRHs (remote radio head)/RRUs (remote radio unit). In an example, an ideal/non-ideal backhaul may be configured between TRP 1 and TRP 2 configuring a network side. In addition, the following description is described based on a plurality of TRPs, but it may be equally extended and applied to transmission through a plurality of panels/cells and may be extended and applied to transmission through a plurality of RRHs/RRUs, etc.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID). In an example, when one UE is configured to perform transmission and reception with a plurality of TRPS (or cells), it may mean that a plurality of CORESET groups (or CORESET pools) are configured for one terminal. A configuration on such a CORESET group (or a CORESET pool) may be performed through higher layer signaling (e.g., RRC signaling, etc.). In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

UE may receive configuration information through/by using TRP1 and/or TRP2 from a network side S105. The configuration information may include information related to network-side configuration (i.e., TRP configuration), resource allocation information related to multiple TRP-based transmission and reception, and the like. In this case, the configuration information may be transmitted through higher layer signaling (e.g., RRC signaling, MAC-CE, etc.). In addition, when the configuration information is pre-defined or configured, the corresponding step may be omit-ted.

For example, the configuration information may include CORESET-related configuration information (e.g., Control-ResourceSet IE) as described in the above-described meth-ods (e.g., at least one of Embodiment 1-1, Embodiment 1-2, Embodiment 1-3, Embodiment 2, Embodiment 3, Embodi-ment 4-1, Embodiment 4-2, Embodiment 4-3, or Embodi-ment 4-4). The CORESET-related configuration information may include a CORESET-related ID (e.g., controlResource-SetID), an index of a CORESET pool for CORESET (e.g., CORESETPoolIndex), time/frequency resource configura-tion of CORESET, TCI information related to CORESET, etc. The index of the CORESET pool (e.g., CORESET-PoolIndex) may mean a specific index mapped/set to each CORESET (e.g., CORESET group Index, HARQ Codebook index).

For example, as described in the methods (e.g., at least one of Embodiment 1-1, Embodiment 1-2, Embodiment 1-3, Embodiment 2, Embodiment 3, Embodiment 4-1, Embodi-ment 4-2, Embodiment 4-3, or Embodiment 4-4) described above, the configuration information may include PTRS-related configuration information (e.g., frequencydensity/timedensity/maxNrofports/PTRS power, etc.)/PUSCH-re-lated configuration (e.g., PUSCH Config)/SRS-related configuration (e.g., SRS config). For example, the PUSCH-related configuration may include txconfig (e.g. codebook/noncodebook)/maxrank/codebooksubset (eg fullyAndPar-tialAndNonCoherent, partialAndNonCoherent, nonCoherent)/PUSCH resource configuration. For example, the SRS-related configuration may include SRS resource set configuration/SRS resource configuration/resource type, and the like.

For example, an operation that UE (100 or 200 in FIG. 11) in the above-described stage S105 receives the configuration information from a network side (200 or 100 in FIG. 11) may be implemented by a device in FIG. 11 which will be described after. For example, in reference to FIG. 11, at least one processor 102 may control at least one transceiver 106 and/or at least one memory 104, etc. to receive the configu-ration information and at least one transceiver 106 may receive the configuration information from a network side.

UE may transmit a reference signal for UL transmission through/by using TRP1 and/or TRP2 to a network side S110. For example, the reference signal may be transmitted based on the configuration information and in an example, the reference signal may be a SRS. For example, another reference signal (e.g., a CSI-RS) associated with a spatial relation/beamformer/precoder which will be applied to the reference signal may be configured based on the configura-tion information and the reference signal (e.g., a SRS) may be transmitted based on a spatial relation/beamformer/pre-coder of the another reference signal (e.g., a CSI-RS).

If UE directly obtains a spatial parameter for uplink transmission based on a DL RS resource from a network side, a stage for reference signal transmission (e.g., a SRS) in stage S110 may be omitted. Accordingly, an association between a DL RS resource and a SRS resource may not be configured or defined for UE.

For example, an operation that UE (100 or 200 in FIG. 11) in the above-described stage S110 transmits the reference signal to a network side (200 or 100 in FIG. 11) may be implemented by a device in FIG. 11 which will be described after. For example, in reference to FIG. 11, at least one processor 102 may control at least one transceiver 106 and/or at least one memory 104, etc. to transmit the refer-ence signal and at least one transceiver 106 may transmit the reference signal to a network side.

UE may receive control information from a network side S115. As an example, the control information may include scheduling information/UL grant for UL channel (e.g., PUCCH/PUSCH)/UL signal (e.g., SRS) transmission. For example, the control information may include information on one or more of TCI state(s), QCL RS(s), and DMRS port(s). The control information may be received through a control channel (e.g., a PDCCH). In an example, the control information may be DCI. In an example, control information may be configured according to DCI format 0-1 or DCI format 0-0.

Also, DCI may be transmitted through a control channel (e.g., PDCCH, etc.). In FIG. 10, an example of a single DCI-based MTRP operation will be mainly described, but it may also be applied to multiple DCI-based MTRP opera-tions. In this case, the UE may receive DCI 1 through/using TRP 1 from the network side, and receive DCI 2 through/using TRP 2.

For example, as described in the methods (e.g., at least one of Embodiment 1-1, Embodiment 1-2, Embodiment 1-3, Embodiment 2, Embodiment 3, Embodiment 4-1, Embodi-ment 4-2, Embodiment 4-3, or Embodiment 4-4) described above, the DCI may include scheduling information/MCS/SRI/precoding information and the number of layers/PTRS-DMRS association field/TPMI field of an uplink channel (e.g., PUCCH/PUSCH). For example, PTRS-DMRS asso-ciation may be configured/indicated for each TRP based on the DCI.

For example, the operation in which the UE (100 or 200 in FIG. 1) receives the control information from the network side (200 or 100 in FIG. 1) in step S115 described above may be implemented by the apparatus of FIG. 11 to be described below. For example, referring to FIG. 11, the one or more processors 102 may control one or more transceivers 106 and/or one or more memories 104, etc. to receive the control information, and the one or more transceivers 106 may receive the control information from a network side.

The UE may perform uplink transmission (e.g., UL data/signal transmission) through/using TRP 1 and/or TRP 2 to the network side (S120).

For example, the UE may perform channel estimation and/or encoding on data based on the above-described method (e.g., at least one of Embodiment 1-1, Embodiment 1-2, Embodiment 1-3, Embodiment 2, Embodiment 3, Embodiment 4-1, Embodiment 4-2, Embodiment 4-3, or Embodiment 4-4). For example, SRS resources indicated based on DCI are classified for each TRP, and the number of PTRSs for each TRP is determined according to the number of PTRS port indexes corresponding to the SRS resources corresponding to each TRP to perform encoding.

For example, the operation of encoding data 1 and data 2 by the UE (100/200 in FIG. 11) in step S120 described above may be implemented by the apparatus of FIG. 11 to be described below. For example, referring to FIG. 11, the one or more processors 102 may control the encoding operation of the data 1 and the data 2.

The UE may transmit data 1 through/using TRP 1 from the network side. In addition, the UE may transmit data 2 through/using TRP 2 from the network side. Also, data (e.g., data 1/data 2) may be transmitted through a data channel (e.g., PUSCH, etc.). In addition, step S120 may be per-formed simultaneously or one may be performed earlier than the other.

For example, the data 1/data 2 may be transmitted based on the method described in the above-described method (e.g., at least one of Embodiment 1-1, Embodiment 1-2, Embodiment 1-3, Embodiment 2, Embodiment 3, Embodiment 4-1, Embodiment 4-2, Embodiment 4-3, or Embodiment 4-4). For example, the data 1/data 2 may be transmitted toward different TRPs for each TO, and may be transmitted based on the PTRS-DMRS association described in the above-described method (e.g., at least one of Embodiment 1-1, Embodiment 1-2, Embodiment 1-3, Embodiment 2, Embodiment 3, Embodiment 4-1, Embodiment 4-2, Embodiment 4-3, or Embodiment 4-4). For example, the data 1 and/or the data 2 may be scheduled based on the DCI.

For example, the operation of transmitting the data 1 and/or the data 2 to the network side (100/200 in FIG. 11) of the UE (100/200 in FIG. 11) of the step S120 described above may be implemented by the apparatus of FIG. 11 to be described below. For example, referring to FIG. 11, one or more processors 102 may control one or more transceivers 106 and/or one or more memories 104, etc. to transmit the data 1 and/or the data 2 and one or more transceivers 106 may transmit the data 1 and/or the data 2 to the network side.

As mentioned above, the network-side/terminal operation described above (e.g., at least one of Embodiment 1-1, Embodiment 1-2, Embodiment 1-3, Embodiment 2, Embodiment 3, Embodiment 4-1, Embodiment 4-2, Embodiment 4-3, or Embodiment 4-4) may be implemented by an apparatus (e.g., the apparatus of FIG. 11) to be described below. For example, the UE may correspond to a first wireless device, the network side may correspond to a second wireless device, and vice versa may be considered in some cases.

Figure 11:
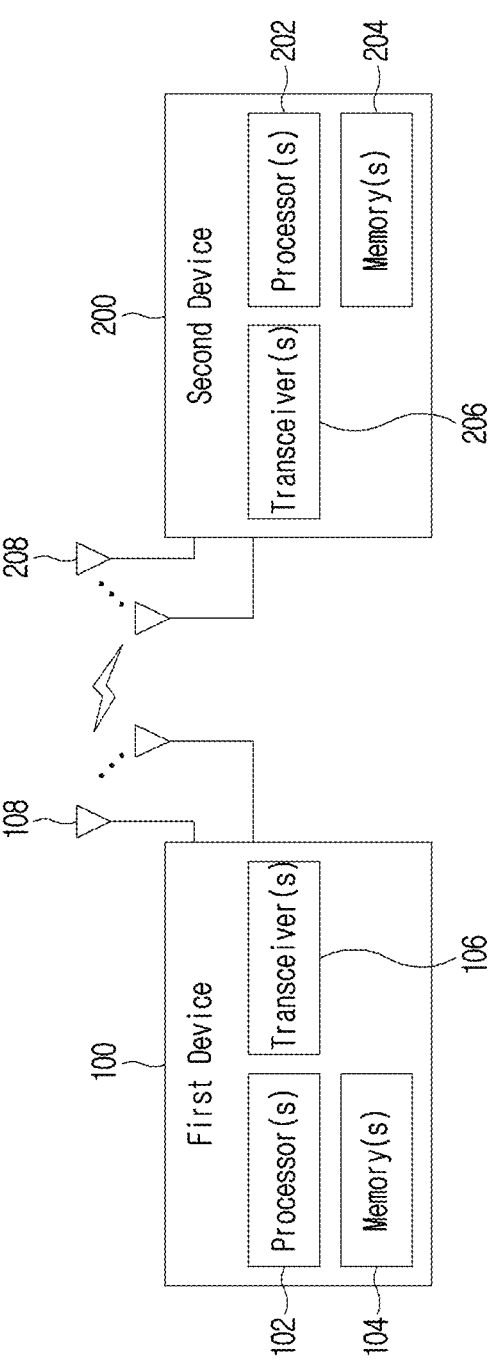
FIG. 11 illustrates a block diagram of a wireless communication system according to an embodiment of the present disclosure.

For example, the network-side/UE operation described above (e.g., at least one of Embodiment 1-1, Embodiment 1-2, Embodiment 1-3, Embodiment 2, Embodiment 3, Embodiment 4-1, Embodiment 4-2, Embodiment 4-3, or Embodiment 4-4) may be processed by one or more processors (e.g., 102, 202) of FIG. 11, and the above-described network-side/UE operations (e.g., at least one of Embodiment 1-1, Embodiment 1-2, Embodiment 1-3, Embodiment 2, Embodiment 3, Embodiment 4-1, Embodiment 4-2, Embodiment 4-3, or Embodiment 4-4) may be stored in the memory (e.g., one or more memories (e.g., 104, 204) of FIG. 11) in the form of instructions/programs (e.g., instructions, executable code) for driving one or more processors (e.g., 102 and 202) of FIG. 11.

General Device to which the Present Disclosure May be Applied

FIG. 11 is a diagram which illustrates a block diagram of a wireless communication system according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving, by a user equipment (UE) from a base station, a radio resource control signal including information related to a plurality of sounding reference signal (SRS) resource sets, wherein the plurality of SRS resource sets include a first SRS resource set and a second SRS resource set;

receiving, by the UE from the base station, downlink control information (DCI) including a SRS resource set indicator field related to at least one of the plurality of SRS resource sets and a plurality of SRS resource indicator (SRI) fields, wherein the plurality of SRI fields include a first SRI field related to the first SRS resource set and a second SRI field related to the second SRS resource set; and performing uplink transmission based on the DCI, wherein based on a maximum rank or layer of the uplink transmission being 2:

the DCI includes a single 2 (two)-bit phase tracking reference signal (PTRS)—demodulation reference signal (DMRS) association field, a most significant bit (MSB) of the single 2-bit PTRS-DMRS association field includes first information related to an association between a PTRS port and a DMRS port corresponding to at least one of the first SRI field or a first precoding information and number of layers field, and a least significant bit (LSB) of the single 2-bit PTRS-DMRS association field includes second information related to an association between a PTRS port and a DMRS port corresponding to at least one of the second SRI field or a second precoding information field, and wherein, based on the maximum rank or layer of the uplink transmission being more than 2:

the DCI includes a first 2-bit PTRS-DMRS association field and a second 2-bit PTRS-DMRS association field, the first 2-bit PTRS-DMRS association field includes the first information, and the second 2-bit PTRS-DMRS association field includes third information related to an association between a PTRS port and a DMRS port corresponding to at least one of the first SRI field or a first precoding information and number of layers field, and the second 2-bit PTRS-DMRS association field includes fourth information related to an association between a PTRS port and a DMRS port corresponding to at least one of the second SRI field or a second precoding information field.

2. The method of claim 1, wherein:

the uplink transmission includes physical uplink shared channel (PUSCH) transmission.

3. The method of claim 1, wherein:

the uplink transmission for the first SRI field or the first precoding information and number of layers field includes PTRS transmission through the PTRS port associated with the DMRS port indicated by the first information, and the uplink transmission for the second SRI field or the second precoding information field includes PTRS transmission through the PTRS port associated with the DMRS port indicated by the second information.

4. The method of claim 1, wherein:

the uplink transmission is a non-codebook-based transmission or a codebook-based transmission.

5. A user equipment (UE) comprising:

at least one transceiver; and at least one processor connected to the at least one transceiver, wherein the processor is configured to:

receive, through the at least one transceiver, a radio resource control signal including information related to a plurality of sounding reference signal (SRS) resource sets from a base stations, wherein the plurality of SRS resource sets include a first SRS resource set and a second SRS resource set;

receive, through the at least one transceiver, downlink control information (DCI) including a SRS resource set indicator field related to at least one of the plurality of SRS resource sets, and a plurality of SRS resource indicator (SRI) fields, wherein the plurality of SRI fields include a first SRI field related to the first SRS resource set and a second SRI field related to the second SRS resource set from a base station; and perform uplink transmission based on the DCI, wherein, based on a maximum rank or layer of the uplink transmission being 2:

the DCI includes a single 2 (two)-bit phase tracking reference signal (PTRS)—demodulation reference signal (DMRS) association field, a most significant bit (MSB) of the single 2-bit PTRS-DMRS association field includes first information related to an association 5 between a PTRS port and a DMRS port corresponding to at least one of the first SRI field or a first precoding information and number of layers field, and a least significant bit (LSB) of the single 2-bit PTRS-DMRS association field includes second information related to 10 an association between a PTRS port and a DMRS port corresponding to at least one of the second SRI field or a second precoding information field, and wherein, based on the maximum rank or layer of the uplink transmission being more than 2: 15 the DCI includes a first 2-bit PTRS-DMRS association field and a second 2-bit PTRS-DMRS association field, the first 2-bit PTRS-DMRS association field includes third information related to an association between a PTRS port and a DMRS port corresponding to at least 20 one of the first SRI field or a first precoding information and number of layers field, and the second 2-bit PTRS-DMRS association field includes fourth information related to an association between a PTRS port and a DMRS port corresponding to at least one of the second 25 SRI field or a second precoding information field.

6. A method comprising:

transmitting, by a base station to a user equipment (UE), a radio resource control signal including information related to a plurality of sounding reference signal (SRS) 30 resource sets, wherein the plurality of SRS resource sets include a first SRS resource set and a second SRS resource set;

transmitting, by the base station to the UE, downlink control information (DCI) including a SRS resource set 35 indicator field related to at least one of the plurality of SRS resource sets, and a plurality of SRS resource indicator (SRI) fields, wherein the plurality of SRI fields include a first SRI field related to the first SRS resource set and a second SRI field related to the second SRS resource set; and performing uplink reception based on the DCI, wherein, based on a maximum rank or layer of the uplink reception being 2:

the DCI includes a single 2 (two)-bit phase tracking reference signal (PTRS)—demodulation reference signal (DMRS) association field, a most significant bit (MSB) of the single 2-bit PTRS-DMRS association field includes first information related to an association between a PTRS port and a DMRS port corresponding to at least one of the first SRI field or a first precoding information and number of layers field, and a least significant bit (LSB) of the single 2-bit PTRS-DMRS association field includes second information related to an association between a PTRS port and a DMRS port corresponding to at least one of the second SRI field or a second precoding information field, and wherein, based on the maximum rank or layer of the uplink reception being more than 2:

the DCI includes a first 2-bit PTRS-DMRS association field and a second 2-bit PTRS-DMRS association field, the first 2-bit PTRS-DMRS association field includes third information related to an association between a PTRS port and a DMRS port corresponding to at least one of the first SRI field or a first precoding information and number of layers field, and the second 2-bit PTRS-DMRS association field includes fourth information related to an association between a PTRS port and a DMRS port corresponding to at least one of the second SRI field or a second precoding information field.

* * * * *